Nov. 2, 1954
H. W. ACKER, JR., ET AL
2,693,033
INSTRUMENT FOR CHECKING THE DISTANCE
BETWEEN HOLES OF DIFFERENT DIAMETERS
Filed Dec. 5, 1950
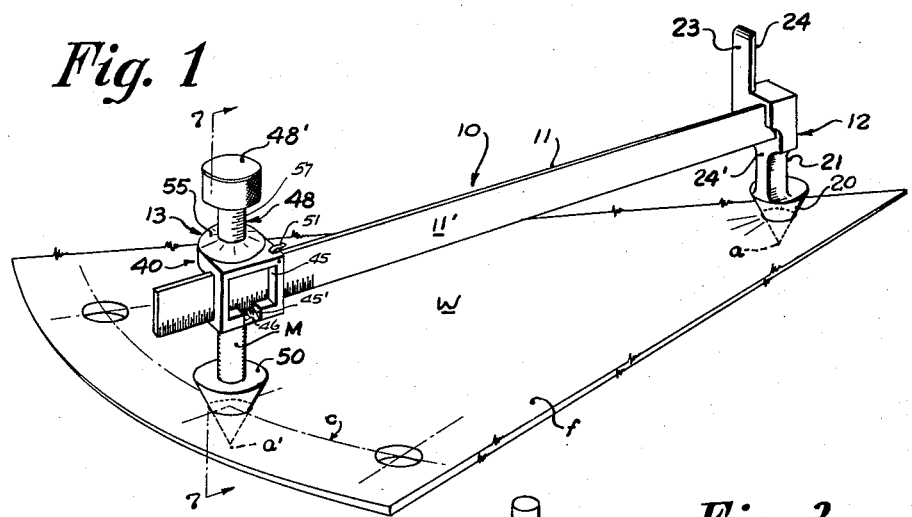
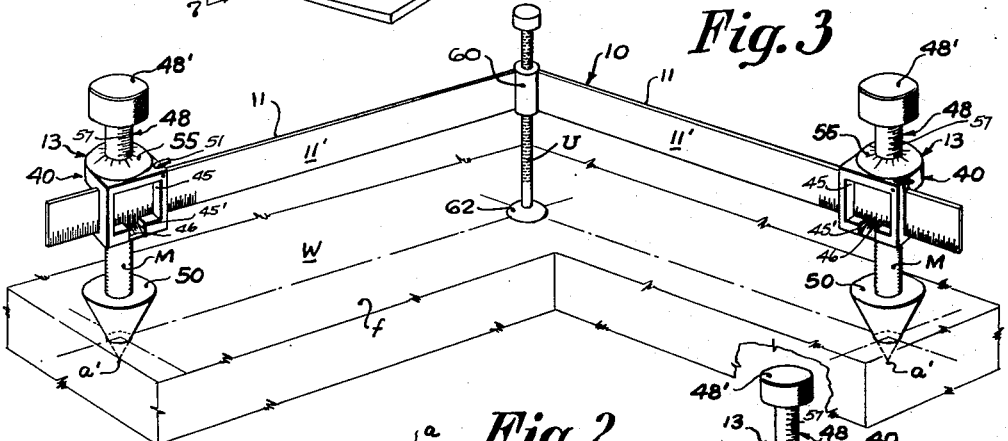
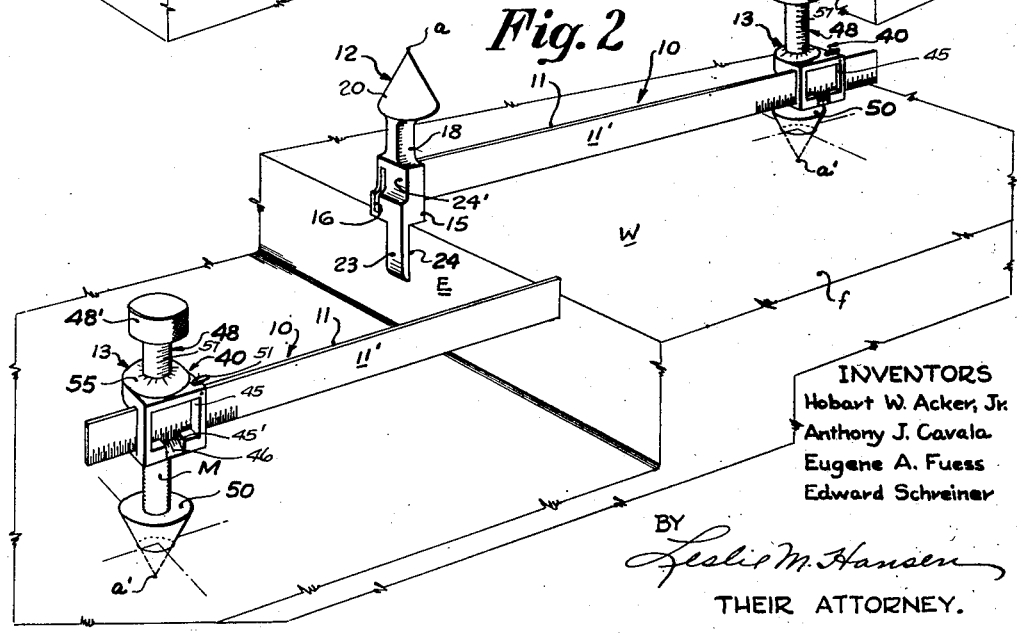
INVENTORS
Hobart W. Acker, Jr.
Anthony J. Cavala
Eugene A. Fuess
Edward Schreiner
BY
*Leslie M. Hansen*
THEIR ATTORNEY.

Nov. 2, 1954 H. W. ACKER, JR., ET AL 2,693,033
INSTRUMENT FOR CHECKING THE DISTANCE
BETWEEN HOLES OF DIFFERENT DIAMETERS
Filed Dec. 5, 1950 2 Sheets-Sheet 2
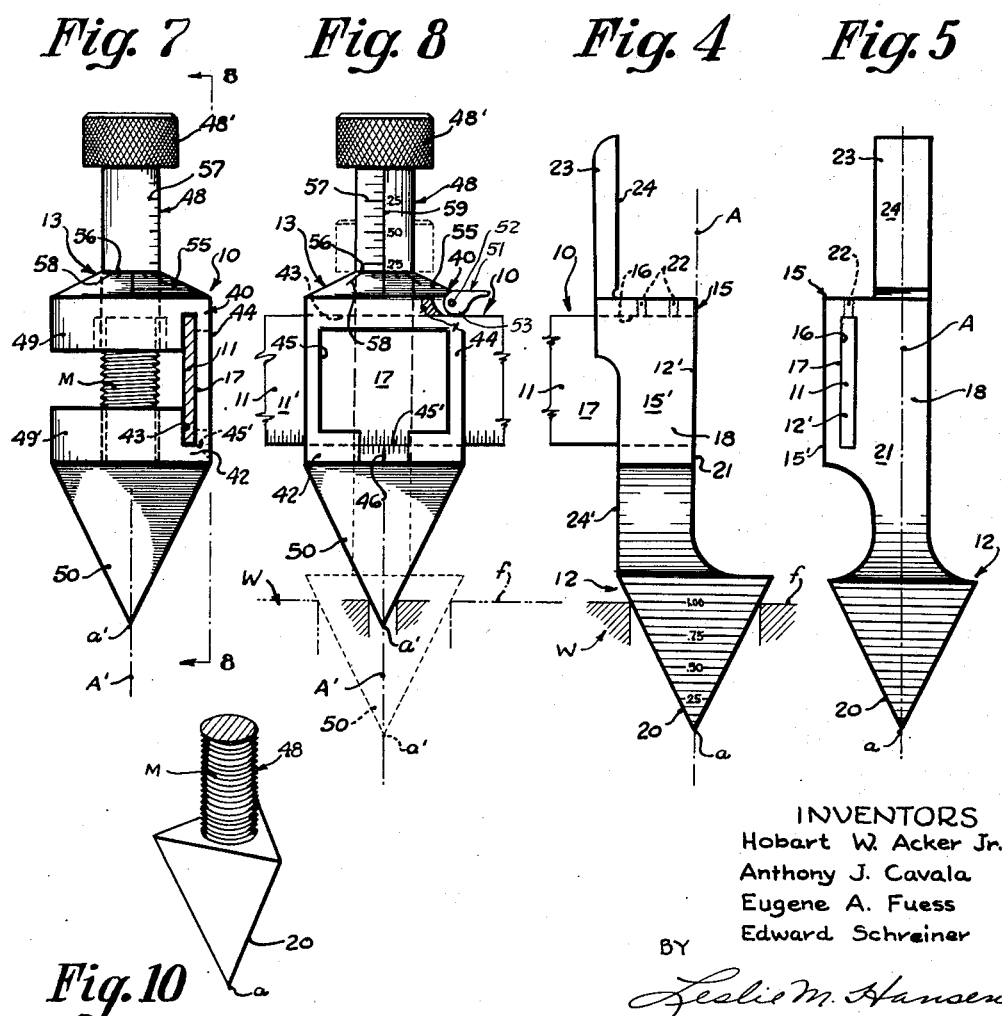
INVENTORS
Hobart W. Acker Jr.
Anthony J. Cavala
Eugene A. Fuess
Edward Schreiner
BY
Leslie M. Hansen
THEIR ATTORNEY.

United States Patent Office 2,693,033
Patented Nov. 2, 1954

2,693,033

INSTRUMENT FOR CHECKING THE DISTANCE BETWEEN HOLES OF DIFFERENT DIAMETERS

Hobart William Acker, Jr., Sunnyvale, and Anthony Joseph Cavala, San Jose, Calif., Eugene A. Fuess, Rego Park, N. Y., and Edward Schreiner, Fresno, Calif.

Application December 5, 1950, Serial No. 199,267

2 Claims. (Cl. 33—158)

This invention relates to measuring and/or checking instruments and more particularly to certain novel improvements in instruments of the type named.

It is an object of this invention to provide an instrument capable of being pre-set for accurately checking on an article the distance between existing holes therein regardless of differences in diameter of such holes; the distance between an existing hole and either a ledge or a shoulder formed on the article being checked; or for checking the longitudinal as well as the lateral spacing of existing holes from each other, irrespective of variations in the diameters of such existing holes.

The invention contemplates the provision of fixed and shiftable work-contacting pieces carried by a vernier calibrated beam and micrometer means for presetting the work-contacting pieces relative to each other prior to applying them to the article to be checked. To this end it is another object of this invention to provide at zero on the calibrated beam, a work-contacting piece having a wedge-like tip, the apex of which coincides with zero, and a like tipped sliding work-contacting piece provided with means for advancing or retracting its tip relative to and transversely of the beam.

In connection with the foregoing it is another object to provide the sliding work-contacting piece with an advancing or retracting means calibrated for accurate settings determined by the depth of extension of the wedgelike tip on the zero work-engaging piece with respect to the surface of the work adjacent the beam. Still another object is to provide the advancing and retracting means with calibrations coordinated with the angle of the wedgelike tips to attain accurate settings of the tips of the two work contacting pieces based upon differences in diameters of holes about to receive the respective tips.

These and other objects of the present invention will become apparent from the following description and drawings in which:

Fig. 1 is a perspective view of an instrument embodying the present invention for checking the distance between holes in a common surface.

Fig. 2 is similar to Fig. 1 but showing the mode of applying the present instrument to an article for checking the distance between a hole and an edge or a shoulder of the article.

Fig. 3 is similar to Figs. 1 and 2 but showing the present instrument in use for checking lateral and longitudinal distances between holes.

Fig. 4 is an enlarged side view of the right hand work-contacting piece of Fig. 1.

Fig. 5 is an end view of Fig. 4 and Fig. 6 is a view of Fig. 4 as seen from above.

Fig. 7 is an enlarged section of Fig. 1 taken along lines 7—7 thereof.

Fig. 8 is a side view of Fig. 7 as seen from line 8—8 therein.

Fig. 9 is a view of Fig. 8 as seen from above; and

Fig. 10 is a perspective view of a modified form of tip from those shown in the foregoing views.

Referring to Figs. 1 and 4 through 9 of the drawings, the instrument embodying the present invention is generally designated 10. The instrument 10 resembles a beam compass in that it comprises a beam 11 carrying a fixed work-contacting member 12 and another work-contacting member 13 arranged on the beam for sliding movement lengthwise thereof.

For purposes of the present invention the beam 11 is calibrated and preferably consists of a conventional vernier machinists rule or scale 11' on which the calibrations are units of measure commonly used in machine design.

The fixed work-contacting member 12 forming a part of the present invention provides a zero registering device 12' for the beam scale 11'. This device 12' comprises a mounting block 15 having a passage 16 formed therethrough to receive the scale 11' with its calibrated face disposed vertically. Transversely of the scale passage 16 the block 15 is provided with a shank 18 which is offset laterally from the scale to extend parallel to the vertical face 17 thereof. The lower end of the shank 18 has a wedgelike tip 20 formed thereon.

The tip 20 may be a flat triangular metal unit or a three sided pyramid as illustrated in Fig. 10. For purposes of the present invention the tip is preferably of conical shape. In each case, however, the apex a or point of the tip 20 coincides with the zero reading on the scale 11' and the angle between the sides of the tip is the same in each form for reasons later to be made apparent.

It will be noted in Figs. 4 and 6 that the front face 21 of the shank 18 is in vertical alignment with the axis A of the tip 20, the shank 18 extending to one side of this axis to receive the zero end of the scale 11'. Set screws 22 are provided in the upper end of the shank 18, for securing the latter to the scale beam.

The upper end of the shank 18 is further provided with an upstanding stop finger 23, the face 24 of which extends parallel to the axis A of tip 20 in alignment with the rear face 24' of the shank 18. The face 24 is disposed perpendicularly to the top surface of the block 15, and as shown in Fig. 4, forms a re-entrant angle therewith. The top surface is located at a predetermined distance from the top of the beam opening 16 in the block 15. This stop finger 23, as depicted in the upper example in Fig. 2, serves as an abutment for engaging a shoulder or edge E of a piece of work W when the fixed work-contacting member 12 is inverted. In such event the scale 11' is removed from the passage 16 and again inserted from the other side of the shank to dispose zero of the scale in alignment with the face 24' of the stop finger 23.

The movable work-contacting member 13, as best seen in Figs. 7, 8 and 9, comprises a rider 40 which is substantially round as seen from above in Fig. 9. The radius of the rider 40 coincides with the distance between the axis of the cone 20 of the fixed work-contacting member 12 and the face 15' of the mounting block 15 thereof, see Figs. 9 and 6. In this connection the rider 40 has a tangentially spread portion 42 at one side thereof comparable to the mounting block 15. This portion 42 is provided with a passage 43 comparable to the passage 16 for slidingly receiving the scale 11'. The face 44 of portion 42, comparable to the face 15', is cut out to form a sight opening 45, the lower margin of which is cut away as at 45' to the lower edge of the passage 43. In this manner the graduations on the scale 11' are visible through the sight opening 45—45' for register with an indicia line 46 scribed on the face 44 in alignment with the axis A' of the rider 40.

From the foregoing it will be apparent that the axis A' of the rider 40 is disposed laterally, i. e., behind the scale 11' in the identical manner as is the axis A of the tip 20 of the fixed work-contacting member 12. The rider 40 is bored coaxially of its axis A' for the reception of a shank 48. As best seen in Fig. 7, the rider 40 has upper and lower portions 49 and 49' joined by the tangentially spread portion 42. The lower portion 49' is threaded to fit like threading on the lower end of the shank 48. The upper end of the shank 48 extends through the bore in the portion 49 for guidance thereby. The shank 48 has a knurled head 48' for manually turning the shank to thereby facilitate advancing or withdrawing the shank relative to the rider 40.

The shank 48 has a wedgelike tip 50 formed on its lower end which is comparable in form to the tip 20 at the lower end of the fixed member 12. For purposes of the present disclosure, when the head 48' engages the top of the rider 40 the tip 50 will assume a position (dotted lines Fig. 8) spaced from the scale a distance identical to that of the spacing of the tip 20 therefrom.

However, it is apparent that by making the shank 48 longer the tip 50 thereon can be extended a distance exceeding that of the tip 20 from the scale.

The foregoing relationship of the two tips 20 and 50 with respect to the scale is important for the purpose of measuring the distance between holes in a piece of work. In this connection it is of primary importance that the scale or beam be maintained parallel to the face *f* of the work W or at least perpendicular to the axis of the holes therein being checked. Consequently, in laying out the centers for holes to be drilled or in scribing a circle such as the one illustrated at *c* in Fig. 1, the apexes *a—a'* of the tips 20—50 are equally spaced from the scale as in the case of a conventional beam compass. Obviously, the rider 40 must be secured to the beam 11 to assure against accidental misplacement of the preset rider relative to the scale 11'. For this purpose a finger actuated locking means 51 is pivotally mounted at 52 on the rider and provided with an eccentric 53 for bearing down upon the beam, see Figs. 8 and 9.

When the instrument 10 is used for checking the distance between holes of equal diameter the tips 20 and 50 are equally spaced from the scale because these tips seat themselves to the same depth in such holes. However, when these holes are of different diameter the tip 50 must be shifted perpendicularly relative to the scale to compensate for variations in diameter of the holes. In other words, the shank 48 must be advanced or retarded a distance determined by the difference of diameter of the two holes engaged by the tips 20 and 50.

For purposes of explanation the tips 20 and 50 shown in Figs. 4 and 8, respectively, are illustrated in association with holes of different diameter. The tip 20 shown in Fig. 4 is seated in a hole of one inch diameter and the tip 50 in Fig. 8 is seated in a hole of 3/16 of an inch diameter.

In connection with the foregoing example it will be noted that the cone shaped tip 20 is provided with graduated indicia, each spaced from the other 1/16 of an inch relatively along the axis A. If desired, the cone 50 may also carry like graduations. Moreover, the angle between the conical sides of each tip is such that for each plane spaced 1/16 of an inch along the altitudinal axis A, the base dimension at such planes increase by increments of 1/16 of an inch from the apex *a* to the enlarged end of the tip. Consequently, the tips 20 and 50 seat 1/16 of an inch deeper into a hole for each 1/16 increment in diameter of such holes. The proximity of the scale 11' relative to the surface *f* of the work is changed accordingly and as the hole receiving the tip 50 is of lesser diameter than the hole in which the tip 20 is disposed some compensation must be made for this variance.

Means for compensating variations in diameter of the holes comprises screw threads M and micrometer readings on the shank 48 to which the tip 50 is attached. This screw thread M may be of any desired pitch but preferably is of a pitch coordinated with the spacing of the graduated indicia on the cone 20 hereinbefore explained. In the present disclosure a 1/16 inch pitch is illustrated so that each complete turn of the screw shank 48 advances or withdraws the tip 50 1/16 of an inch relative to the main body of the rider 40.

As best seen in Figs. 7 and 8 the upper end 55 of the rider 40 is preferably in the form of a frusto-conical dome in which the upper edge 56 of the dome constitutes a gauge line cooperating with micrometer readings 57 etched on the upper portion of the shank 48 to indicate the disposition of the tip 50 relative to the rider 40. The horizontal graduations 57, for example, correspond to the spaced graduated indicia on the zero indicating cone 20. In the example depicted in Figs. 4 and 8 the difference in diameter of the two holes illustrated is 13/16 of an inch. Therefore, the micrometer reading on the shank 48 is set at .8125. This places a 3/16 inch peripheral diameter of the cone 50 in a plane coincident to the face *f* of the work W and the one inch diameter graduation of the cone 20. With this setting the beam 11 will be disposed parallel to the face *f* of the work W and the axes A and A' coincident to the centers of the respective holes.

Additional indicia 58 arranged radially about the frusto-conical surface 55' of the dome 55 cooperate with a vertical marking 59 on shank 48 to indicate fractions of a full turn of the shank 48. Since the pitch of the threading M is coordinated with the angle of the cones the tip 50 can be set at positions minutely less than 1/16 of an inch variances hereinbefore referred to. For instance each half turn of the shank results in a 1/32 inch variance from a previous setting of the tip 50 and each quarter turn results in a 1/64 inch variance thereof, etc.

From the foregoing it will be apparent that when the distance between centers of two holes is known, the rider 40 can be accurately set with its indicia line 46 in register with the proper reading on the scale 11'. Moreover, when the differences in diameter of the two holes is known this can be compensated for by turning the shank 48 until the desired micrometer reading thereon registers with the gauge line 59 and any intermediate radial graduations on the dome 55 of the rider. With the instrument 10 thus set its tips 20 and 50 should fit perfectly into the holes in question with assurance that the scale beam 11 is parallel to the face *f* of the work W and the axes A and A' of the tips are coaxial with the centers of the holes. Any irregularity in the foregoing indicates an inaccuracy in the spacing or diameter of the holes and accordingly work found to be inaccurate can be readily detected and rejected.

In each of the foregoing instances it will be noted that the axis A of the fixed work-contacting member 12 is in register with the zero reading of the scale 11'. However, when the zero end of the scale abuts a shoulder such as the one E shown in Fig. 2, the same result is obtained.

Referring to Fig. 3 wherein two scales are employed it will be noted that their zero edges meet at a boss 60 to which they are secured. This boss 60 is associated with a threaded leg U having a pedestal 62 at its lower end for supporting the scales the proper distance from the face *f* of the work. In this latter form the scales are disposed at right angles to each other and each of them carry a movable work-contacting member 13. Consequently, if the holes engaged by the tips 50 of the two members 13 differ in diameter, such differences can be compensated for by setting the micrometer on one of the members 13 at zero and manipulating the micrometer on the other of such members.

While we have described our improved hole checking instrument in specific detail it will be apparent that it can be modified, altered and/or varied in many respects without departing from the spirit of our invention. We, therefore, desire to avail ourselves of all modifications, alterations and/or variations as fairly come within the scope of the appended claims.

What we claim as new and desire to protect by Letters Patent is:

1. In combination with a beam having a scale thereon calibrated from a zero reading at one end surface thereof, and a rider slidably mounted on the beam; a zero indicating member having a pair of laterally offset surfaces thereon formed to align selectively with the zero end surface of said beam, means for securing the zero indicating member in selectively adjusted position on said beam, a symmetrically tapered zero tip having its axis aligned with the zero end surface of the beam in one selectively adjusted position of the zero indicating member, a pair of angularly intersecting surfaces formed on said zero indicating member to form a re-entrant angle, one of said surfaces being a zero indicating surface coincident with the zero end surface of the beam in the other selectively adjusted position of the beam, the other of said angularly intersecting surfaces being disposed a predetermined distance from the beam, a symmetrically tapered measuring tip mounted on said rider with its axis parallel to said zero indicating tip and to said zero indicating surface of said intersecting surfaces in each of the two selectively adjusted position of said zero indicating member, and means for adjusting said measuring tip from said beam in increments proportional to right section diameters through the measuring tip at predetermined distances from the beam.

2. In combination with a beam having a scale thereon calibrated from a zero reading at one end surface thereof, and a rider slidably mounted on the beam; a zero indicating member having a pair of laterally offset surfaces thereon formed to align selectively with the zero end surface of said beam, means for securing the zero indicating member in selectively adjusted position on said beam, a symmetrically tapered zero indicating tip having its axis aligned with the zero end surface of the beam in one selectively adjusted position of the zero indicating member, a zero indicating finger having a zero indicating surface co-incident with the zero end surface of the beam in the other selectively adjusted position of the beam, a symmetrically tapered measuring tip mounted on said rider with its axis parallel to said zero indicating tip and to said zero indicating surface of said intersecting surfaces in each of the two selectively adjusted positions of said zero indicating member, and means for adjusting said measuring tip from said beam in increments proportional to right section diameters through the measuring tip at predetermined distances from the beam.

References Cited in the file of this patent

UNITED STATES PATENTS

| Number | Name | Date |
|---|---|---|
| 1,166,512 | Dannenfelser | Jan. 4, 1916 |
| 1,210,963 | Mascher | Jan. 2, 1917 |
| 1,225,265 | Miller | May 8, 1917 |
| 1,321,312 | Joos | Nov. 11, 1919 |
| 2,178,293 | Wogeck | Oct. 31, 1939 |
| 2,309,809 | Vane | Feb. 2, 1943 |
| 2,462,545 | Cenjaska | Feb. 22, 1949 |
| 2,470,458 | Barr | May 17, 1949 |
| 2,471,193 | Brawer | May 24, 1949 |
| 2,537,473 | McCusker | Jan. 9, 1951 |
| 2,542,561 | Olejniczak | Feb. 20, 1951 |